United States Patent
Gauthier et al.

(10) Patent No.: US 7,081,558 B2
(45) Date of Patent: Jul. 25, 2006

(54) PROCESS FOR RECOVERING HYDROGEN IN A GASEOUS HYDROCARBON EFFLUENT BY CHEMICAL REACTION

(75) Inventors: Thierry Gauthier, Brignais (FR); Jean-Francois Joly, Lyon (FR); Denis Uzio, Maryl le Roi (FR); Germain Martino, Poissy (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 371 days.

(21) Appl. No.: 10/680,417

(22) Filed: Oct. 8, 2003

(65) Prior Publication Data
US 2004/0213733 A1  Oct. 28, 2004

(30) Foreign Application Priority Data
Oct. 8, 2002 (FR) .................................. 02 12452

(51) Int. Cl.
C07C 7/157 (2006.01)
C07C 7/163 (2006.01)

(52) U.S. Cl. ...................................... 585/809; 585/324
(58) Field of Classification Search ................ 585/809, 585/324
See application file for complete search history.

(56) References Cited

U.S. PATENT DOCUMENTS

| | | | | |
|---|---|---|---|---|
| 2,839,449 | A * | 6/1958 | MacPherson et al. | ......... 208/79 |
| 3,019,180 | A | 1/1962 | Schreiner, Jr. et al. | |
| 4,209,383 | A | 6/1980 | Herout et al. | |
| 5,152,975 | A | 10/1992 | Fon et al. | |
| 5,756,872 | A | 5/1998 | Smith, Jr. et al. | |
| 6,252,126 | B1 | 6/2001 | Netzer | |

* cited by examiner

*Primary Examiner*—Thuan D Dang
(74) *Attorney, Agent, or Firm*—Millen, White, Zelano & Branigan, P.C.

(57) ABSTRACT

Process for recovery of hydrogen in an effluent that is rich in hydrocarbons and that also contains hydrogen and a light olefin fraction, whereby said process comprises:
  a stage a) in which said effluent is brought into contact with at least one reagent that can react with said olefins to form with them a complex or a molecule;
  a stage c) in which the effluent that is obtained from stage a) is brought into contact with a composition that comprises at least one unsaturated compound in the presence of a suitable catalyst under hydrogenation conditions of at least a portion of said unsaturated compound by at least a portion of the hydrogen that is present in said effluent;
  a stage d) in which a reaction for dehydrogenation of hydrocarbons that are present in the effluent that is obtained from stage c) is carried out.

31 Claims, 1 Drawing Sheet

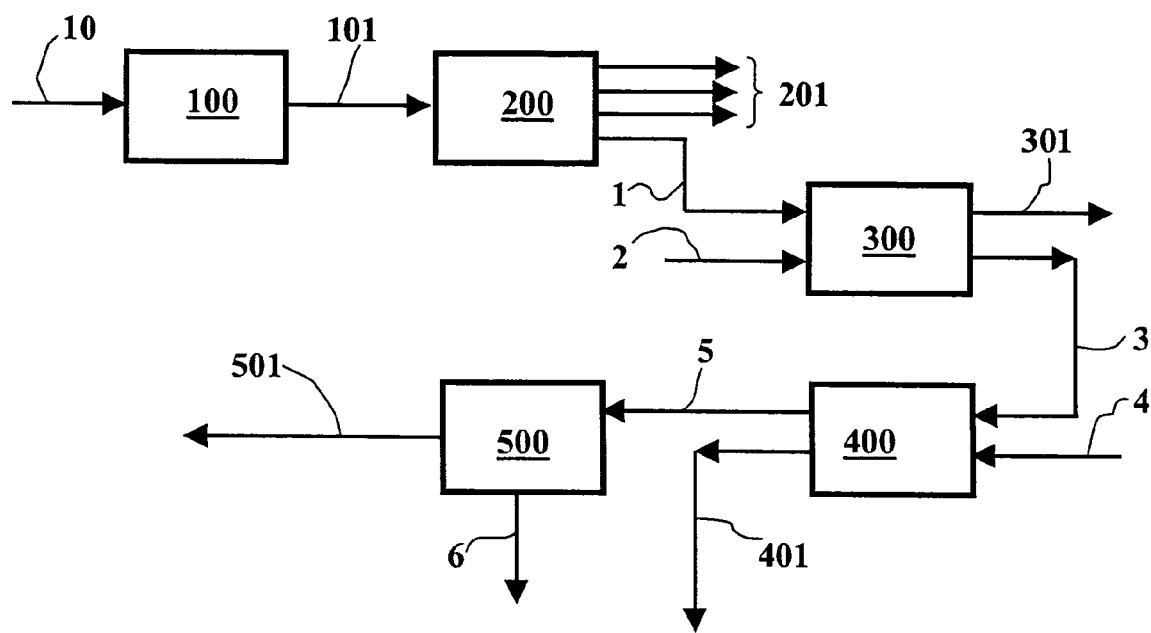

PROCESS FOR RECOVERING HYDROGEN IN A GASEOUS HYDROCARBON EFFLUENT BY CHEMICAL REACTION

The process that is the object of this invention generally pertains to the recovery of hydrogen in feedstocks that consist of all effluents that contain non-negligible amounts of hydrogen, for example the dry-gas fractions that are obtained from processes such as fluidized-bed catalytic cracking (FCC in English, "Fluid Catalytic Cracking"), vaporeforming, catalytic reforming, gasification, partial oxidation, the autothermal process that combines reforming and partial oxidation, or coking and visbreaking.

More specifically, the invention relates to a process that makes it possible to recover at least a portion of the hydrogen that is contained in an effluent or a mixture that contains non-negligible amounts of hydrogen and that also comprises an olefin fraction whose number of carbon atoms is encompassed for the most part most often between 2 and 6, typically between 2 and 3, whereby said process comprises, i.a., a stage preceding said hydrogen recovery in which said effluent or said mixture is brought into contact with a reagent that can react with said olefins to form with them a complex or a molecule.

Said fraction is, for example and in the description below, typically an effluent that is obtained from a catalytic cracking process such as, for example, a fluidized-bed catalytic cracking process (FCC).

Although it is not limited, the process according to this invention thus particularly finds its application for upgrading the hydrogen and optionally the olefins that contain less than four carbon atoms (for the most part ethylene and propylene) that are contained in the dry gas that is produced by the catalytic cracking process FCC.

After the various products that are obtained from the cracking reaction FCC are separated and purified, the lightest products, which consist essentially of hydrocarbons that generally contain fewer than four carbon atoms and hydrogen, are generally sent to the fuel-gas network of the refinery and are used as fuel. This fraction, however, contains a non-negligible amount of hydrogen, which can represent 5–50 mol %, typically 20 mol %, of hydrogen.

Different percentage compositions of such an FCC effluent have already been described:

H2:16.9, H2S:4.6, N2:12.2, CO: 1.7, CH4:32.5, ethylene: 7.2, ethane: 18.5, propylene:2.3, propane: 3.7 and water: 0.4 (Oil and Gas Journal, 26, (1977)).

Within the refinery, the recovery of this hydrogen exhibits a certain economic advantage, in particular for use in the hydroconversion refining units such as, for example, the processes for hydrotreatment of gas oil, gasoline or in all types of hydrogenation processes, for example selective hydrogenations of C2, C3 and C4 fractions that are dienes and/or acetylenes. These processes are known for being highly hydrogen-consumption-intensive. Furthermore, whereby the production of hydrogen is costly, the recovery of hydrogen in the refinery gaseous effluents, for example FCC, may allow the refiner to realize substantial savings.

The recovery of hydrogen in a gas mixture that is obtained in a petroleum refinery and that comprises methane and hydrocarbons with two to five carbon atoms was described, for example, in European Patent EP-B1-445,041. To separate the different components of the mixture, the process proposes successive stages of compression, condensation and distillation, whereby the recovery of hydrogen also requires a stage for the mixture to pass into a gas permeation unit between said stages of compression and condensation.

In general, the invention relates to a process for recovery of hydrogen in a hydrocarbon-rich effluent and also contains hydrogen and a light olefin fraction, whereby said process comprises:

- a stage a) in which said effluent is brought into contact with at least one reagent that can react with said olefins to form with them a complex or a molecule;
- a stage c) in which the effluent that is obtained from stage a) is brought into contact with a composition that comprises at least one unsaturated compound in the presence of a suitable catalyst under hydrogenation conditions of at least a portion of said unsaturated compound by at least a portion of the hydrogen that is present in said effluent;
- a stage d) in which a reaction for dehydrogenation of hydrocarbons that are present in the effluent that is obtained from stage c) is carried out.

This process can also comprise a stage b) for separation in which said complexes or said molecules are removed from the effluent that is obtained from stage a) before stage c) is fed.

According to an embodiment of the invention, the composition that comprises at least one unsaturated compound that is used in stage c) is a naphtha fraction that is obtained from the atmospheric distillation of a crude petroleum whose starting and end points of distillation are encompassed between 80 and 180° C.

Advantageously, the catalyst that is used in stage c) comprises nickel that is deposited on a mineral substrate that is selected from the group that consists of silica or alumina.

Stage a) can comprise at least one alkylation reaction and the reagent that is used in said stage can comprise at least one aromatic compound that comprises 6 to 12 carbon atoms per molecule.

According to the invention, said alkylation reaction optionally can be carried out in the presence of a catalyst of said reaction by a vapor-phase process, a liquid-phase process, or a mixed gaseous-/liquid-phase process.

Typically, the dehydrogenation reaction of stage d) can be a catalytic reforming reaction. The catalyst of the reforming reaction then generally comprises a chlorinated alumina substrate on which was deposited at least one metal encompassed in the group that consists of platinum, rhenium, iridium, tin or germanium.

According to a possible embodiment of the invention, the composition that is used in stage c) can comprise at least a portion of the products that are obtained from a catalytic reforming reaction, preferably the catalytic reforming reaction that is used in stage d.

The hydrocarbon-rich effluent that is treated in the process according to the invention can be a dry gas fraction that is obtained from fluidized-bed catalytic cracking or a dry gas fraction that is obtained from a process that is selected from the group that consists of: vaporeforming, catalytic reforming, gasification, partial oxidation, and the autothermal process that combines reforming and partial oxidation, coking and visbreaking.

According to the invention, it is thus proposed in a simple and inexpensive manner to hydrogenate at least a portion of a suitable hydrocarbon fraction, for example the dry gases that are produced by FCC, with the hydrogen that is encompassed in all or part of the initial feedstock. The collection of hydrogen is generally carried out in the form of a gas mixture of hydrocarbons. The transport of the hydrogen can then be carried out, according to a preferred embodiment of the invention, by a liquid hydrocarbon that can be hydrogenated. The hydrogen is finally recovered then purified typically via a dehydrogenation reaction of the hydrocarbon, for example in a standard catalytic reforming process. The use of specific catalysts of each reaction will advantageously make it possible to promote said hydrogenation and dehydrogenation reactions.

According to an embodiment of the invention, the aromatic hydrocarbons (comprising in general 6 to 10 carbon atoms) that are contained in the feedstocks that feed the catalytic reforming, for example a naphtha fraction, can be hydrogenated under moderate pressure and temperature conditions with the use of suitable catalysts.

Nevertheless, their reactivity in hydrogenation reactions is generally less than that of light olefins, for example ethylene or propylene, which can be contained in large proportions in the initial feedstock. Said hydrogenated olefins are then much more difficult to dehydrogenate during the subsequent stage of recovery of the hydrogen, for example, by catalytic reforming. Thus, the direct hydrogenation of a reforming feedstock in contact with dry gas in the presence of catalyst would inevitably lead to the conversion of said olefins into alkanes, which would undoubtedly result in losing 10 to 60% of the hydrogen, typically 30% of the latter.

The process according to the invention advantageously makes it possible in a simple and economical way to recover a larger amount of the hydrogen that is contained in the effluent to be treated, by bringing into contact said effluent with a reagent that can react with said olefins to form with them a complex or a molecule, whereby said complex or said molecule can then be easily extracted by any suitable method of the mixture that is thus obtained.

The invention will be better understood from reading the description of the non-limiting embodiment of the invention that follows, in connection with the figure.

In the figure, the invention that is used was shown within the framework of a refinery that has an FCC unit and a catalytic reforming process. The feedstock, for example an effluent that is obtained from FCC, is introduced via pipe 10 and converted in cracking reaction zone 100. The gaseous effluents that are produced are evacuated via line 101.

It is known that the FCC is a conversion process that is fed by heavy hydrocarbon fractions, whose boiling point is typically more than 360° C. at atmospheric pressure. The feedstock is vaporized upon contact with hot catalyst (fine particles whose mean diameter is generally encompassed between 50 and 100 μm, whose grain density is encompassed generally between 1000 and 2000 kg/m$^2$ that essentially consist of silica and alumina) and reacts in an elongated reactor of an approximately tubular shape, with temperatures at the outlet of the reactor that are generally encompassed between 480 and 700° C., typically on the order of 500 to 580° C. for a period encompassed between 50 ms and 10 s, typically 1 to 5 s, whereby the ratio between the flow rate by mass of catalyst and the feedstock is generally encompassed between 3 and 20, typically 5 to 8. At the outlet of the tubular reactor, the gaseous effluents are separated from the catalyst particles. The catalyst particles, which contain the carbon deposit (coke) that is formed during the reaction, are sent to a continuous regeneration chamber, where the coke burns and thus heats the catalyst in order to provide the heat that is necessary to vaporize the feedstock and to support the cracking reactions. The feedstock molecules are transformed by the cracking reactions into lighter molecules. It is thus possible to obtain 20 to 90% by weight of molecules whose boiling point is less than 360° C., more typically 50 to 75%. The effluents that are obtained from the FCC reactor are evacuated from the reaction zone after the catalyst particles are separated and go into a fractionation-purification zone 200 that is designed to apportion the cracking products into fractions that feed the various production lines of the refinery. The first stage of the fractionation consists in carrying out distillation at a pressure that is as close as possible to atmospheric pressure. With distillation it is possible to separate the slightly cracked heavy fractions (which boil at temperatures that typically exceed 300–380° C. at the bottom of the column). The intermediate fractions (which boil at temperatures typically encompassed between 100–200° C. and 300–380° C.) are d the column, the light products (light gasoline, liquefied petroleum gas LPG, ethane, ethylene, water, hydrogen, H$_2$S, CO, CO$_2$, COS, etc.) pass through a condensation stage at a temperature encompassed between 30 and 100° C., typically close to 30–60° C., in order in particular to separate the water from the gaseous products at near-atmospheric pressure, typically less than 0.2 MPa (absolute). The condensed products are generally refluxed back to the column, as regards the less dense hydrocarbons, and to acid-water treatment for the essentially aqueous liquid phase. The non-condensed products are generally compressed by one or more compression stages to approximately 1–2 MPa (absolute).

One or more absorption stages, followed by washing by contact with liquid hydrocarbon fractions and basic aqueous solutions such as amines, make it possible to eliminate gradually the bulk of the hydrocarbons that contain more than 2 carbon atoms, the traces of water, and H$_2$S.

After the various products that are obtained from the cracking reaction are separated and purified, the lightest products, which consist essentially of molecules that contain fewer than three carbon atoms as well as hydrogen, are routinely sent to the "fuel-gas" network of the refinery and are used as fuel. This fraction, however, contains a non-negligible amount of hydrogen, which can represent 5–50 mol %, typically approximately 20 mol %. The recovery of this hydrogen, for example for the requirements of the refinery in the hydroconverison or hydrogenation processes, is the object of this invention. The recovery of hydrogen from the FCC effluents, which is currently upgraded only as a fuel in the "fuel-gas" network, may allow the refiner to realize substantial savings.

At the end of said purification, a gas is generally obtained that essentially contains ethane, ethylene, methane, hydrogen, nitrogen, and traces of CO, CO$_2$, and COS, which is called FCC dry gas. Upstream from the valve that controls the discharge of the dry gas into the "fuel-gas" network, the pressure is generally between 0.5 and 1.5 MPa, typically 1 to 1.2 MPa, and the temperature is from 30 to 100° C., typically 50 to 60° C.

The composition of the dry gas that is produced from the FCC unit basically depends on the operating conditions (starting temperature of the catalyst at the bottom of the reactor, reactor outlet temperature, and the ratio between the mass flow of catalyst and that of the feedstock), the nature of the catalyst and the metals that are optionally present on it, in particular nickel, the sizing of the reactor, which may or may not promote catalytic contact or thermal degradation of the products, and the degree of conversion of the hydrocarbon feedstock. For typical cracking conditions (reactor outlet temperature of 510–530° C., the ratio between the mass flow of catalyst and that of the feedstock of between 5 and 7, conversion of between 60 and 80%), the dry-gas yield is generally between 1.5 and 5% by weight of the FCC feedstock. This value may be higher, in particular if the reactor temperature is higher.

By way of example, on a unit that processes 65,000 barrels of feedstock per day, a dry-gas yield after separation and washing of 3.64% by weight has been observed, which corresponds to an amount of 15.04 t/hour of dry gas. The table below presents the composition of the dry gas after separation and washing.

TABLE 1

| Component | Mass Flow Rate (t/hour) | Molar Flow Rate (kmol/hour) | Mol % |
| --- | --- | --- | --- |
| $H_2$ | 0.43 | 215.00 | 27.0 |
| Methane | 3.67 | 229.38 | 29.0 |
| Ethane | 2.75 | 91.67 | 11.6 |
| Ethylene | 3.65 | 130.36 | 16.5 |
| Propane | 0.35 | 7.95 | 1.0 |
| Propylene | 2.16 | 51.43 | 6.5 |
| Isobutane | 0.14 | 2.41 | 0.3 |
| Isobutene | 0.04 | 0.86 | 0.1 |
| n-butenes | 0.04 | 0.71 | 0.1 |
| n-butane | 0.05 | 0.71 | 0.1 |
| CO | 0.07 | 2.50 | 0.3 |
| $CO_2$ | 0.10 | 2.27 | 0.3 |
| $N_2$ | 1.59 | 56.79 | 7.2 |
| Total | 15.04 | 792.04 | 100.0 |

The example of Table 1 shows that the dry gas contains approximately 27 mol % of hydrogen; this constitutes a mass flow rate of approximately 430 kg/hour.

In this gas there may remain components other than those mentioned in Table 1 in trace form, such as oxygen (10–500 ppm, typically 200 ppm) (parts per million), $H_2S$ (1 to 10 ppm, typically 1 ppm), ammonia (10–500 ppm, typically 100 ppm), nitrogen oxides $NO_x$ (2–100 ppm, typically 20 ppm), arsine (100–1000 ppb, typically 300 ppb), COS (0.1 to 10 ppm, typically 1 ppm), mercaptans (1 to 500 ppm, typically 10 ppm), and HCN (1 to 10 ppm, typically 2 ppm).

If reference is made to this invention and according to the embodiment that is illustrated by FIG. 1, after the various products that are obtained from the cracking zone are separated and purified in a separation zone 200, fed via line 101, various fractions of products that are evacuated from lines 201 (GPL, gasoline, etc.) and dry gases that are evacuated via line 1 of zone 200 are obtained according to a process as described above.

The dry gases feed a reaction zone 300, whereby this reaction zone is also fed via a line 2 by a composition that comprises aromatic compounds, such as, for example, pure benzene, light reformate, heavy reformate or any other effluent that contains aromatic compounds that most often comprise 6 to 10 carbon atoms. In reaction zone 300, the olefins that are initially present in the dry gases that are obtained from FCC react with the aromatic compounds to provide an effluent that comprises alkylated aromatic compounds 301 and a dry gas that is free of olefins (most often constituted for the most part of ethylene and propylene) or whose olefin content strongly reduced said dry gas is evacuated via line 3.

In reaction zone 300, alkylation reactions of aromatic compounds by the olefins that are contained in the FCC dry gas take place. This stage will make it possible to eliminate these olefins from the FCC dry gas.

Reaction zone 300 is of a known type. It is therefore possible to carry out said alkylation according to the invention by means of any known process.

For example, several processes for alkylation of aromatic compounds by the olefins ethylene and propylene have been described. These processes are aimed at, for example, producing ethylbenzene and cumene for petrochemical uses. Variants of these processes have been introduced so as to be able to use a dilute ethylene source (for example the FCC dry gas as described in U.S. Pat. No. 5,856,607 that claims a production of ethylbenzene starting from the flow that contains dilute ethylene) to produce ethylbenzene with a petrochemical quality, or to lower the benzene content of fractions. Likewise, U.S. Pat. No. 5,756,872 proposes an alkylation of aromatic compounds that are contained in a heavy reformate with FCC dry gas olefins, and U.S. Pat. No. 5,082,990 describes the alkylation of a reformate by the FCC dry gas ethylene.

Usually, two methods are used to produce ethylbenzene from ethylene: a vapor phase process and a liquid phase process. More recently, technologies based on the reactive distillation were also developed.

In a vapor phase, it is possible to cite the process that is developed by the Mobil/Badger Companies (Oil and Gas Journal September 26 (1977)). Patent EP-0308099 claims a process for obtained ethylbenzene in vapor phase by alkylation of the benzene in the presence of dilute ethylene in the presence of catalyst that is based on the ZMS-5 or ZSM-11 zeolite). U.S. Pat. No. 6,252,126 refers to a process for the production of ethylbenzene in a vapor phase with a gas that contains dilute ethylene (3 to 50 mol % of ethylene). The use of dilute ethylene under conditions of the Mobil/Badger process is possible because of a vapor-phase alkylation in the presence of a dilute ethylene source and by implementation of a periodic regeneration of catalyst.

U.S. Pat. No. 4,107,224 describes, according to a different method, a vapor-phase alkylation of benzene by the FCC ethylene in the presence of a ZSM-5-based catalyst.

In the second technology, liquid-phase alkylation is carried out (benzene and ethylene are in a liquid phase). Different solid catalysts can be used in the liquid-phase process, among which it is possible to cite the Y zeolite (U.S. Pat. No. 5,145,817). U.S. Pat. No. 5,030,786 proposes the alkylation of benzene by ethylene in liquid phase in the presence of a solid catalyst, such as, for example, the catalysts that contain the Y, omega and beta zeolites. U.S. Pat. No. 4,891,458 also recommends an at least partial implementation in liquid phase and in the presence of a catalyst that comprises a beta zeolite.

Specific processes were developed to be able to carry out the alkylation of the benzene by the dilute ethylene with a view to producing the ethylbenzene. These processes are based on a gas/liquid technology. For example, Patent Application CN 1207960A refers to an implementation in which the benzene is introduced in liquid form and the dilute ethylene in a vapor phase, in countercurrent to the benzene. Patent Application US 2001/0018545 recommends the use of a catalytic distillation in the presence of a solid catalyst, whereby this manner of operation makes possible the use of dilute ethylene.

In a general way, any technology that is known to one skilled in the art and that is suitable for the alkylation of aromatic compounds by olefins that are contained in a dry gas that is obtained from an FCC process, as may or may not be mentioned above, can be used within the scope of this invention.

Reaction zone 400 is fed via line 4 by a naphtha fraction, for example that is obtained at least in part from the atmospheric distillation of crude petroleum, and via line 3 by the FCC dry gases, obtained from the zone 300 and from which light olefins are removed. The naphtha is hydrogenated in reaction zone 400 in the presence of a catalyst that promotes the hydrogenation of aromatic compounds of fraction 4 under pressure conditions that are generally encompassed between 0.1 and 1.5 MPa at a temperature encompassed between 150° C. and 350° C. The catalyst that is used in this reaction zone 400 is selected so that it can hydrogenate the aromatic compounds of naphtha in the presence of gas impurities. Any type of hydrogenation catalyst that is known to one skilled in the art can be used in this section, such as, for example, catalysts that are based on Pt, Ph, Ru, Ni or else Pd. The catalyst can also contain one or more elements that may or may not be deposited on a refractory oxide-type substrate. Among these substrates, alumina, silica-alumina, silica, carbon, magnesia or else the crystallized silicoaluminates can be used. Because of the presence of inhibiting or poison compounds of the hydrogenation reaction in the gas, preferably a catalyst that resists these poisons, such as nickel that is deposited on a mineral substrate, or else bimetallic formulations that are known for their properties of resistance to certain poisons, such as, for example, the Pt/Pd pair, will be used. In general, the catalyst will undergo an activation stage prior to the introduction of the reagents. This stage consists generally in circulating a stream of hydrogen in the catalyst at an adequate temperature to transform the oxide particles into metallic active phase. This operation can be carried out in situ or ex situ, i.e., in the hydrogenation reactor and outside the reactor in advance. According to the invention, the conversion rates that are obtained relative to the amount of hydrogen that is present can vary preferably, based on the experimental conditions, from 50 to 99.9% in the case of a benzene hydrogenation. Advantageously, the operating conditions are more particularly selected so that the conversion of $H_2$ is at least equal to 98%.

The dry gas at the outlet of zone 400, low in hydrogen and comprising for the most part paraffin compounds that have a carbon number of between 1 and 3, can be, without exceeding the scope of the invention, drawn off via a known technique by a line 401.

The hydrogenated naphtha is then directed via a line 5 toward a catalytic reforming zone 500 where the naphtha, by cyclization and dehydrogenation, sees its octane rating substantially improved. At the outlet of zone 500 via a line 501, a hydrocarbon fraction with a high octane rating that is usually called a reformate and hydrogen that is evacuated via line 6 are recovered.

In a known way, the catalytic reforming process makes it possible to produce hydrogen from hydrocarbons, while promoting the improvement of the octane rating of naphtha fractions that are obtained from the atmospheric distillation. This process is generally fed by light fractions that are obtained for the most part from atmospheric distillation of crude petroleum, with a boiling point encompassed, for example, between 80 and 180° C., and that contains limited amounts of aromatic compounds (generally encompassed between 5 and 20%, typically 7 to 15% by volume) and that typically contain between 6 and 10 carbon atoms per molecule.

This process makes it possible, by using in particular reactions for dehydrogenation of naphthene compounds, dehydrocyclization of paraffin compounds and isomerization of paraffin and naphthene compounds by means of a catalyst that most often comprises an alumina substrate that is slightly chlorinated (chlorine content close to 1% by weight) on which have been deposited metals such as platinum, as the main metal that is most often combined with a second metal, such as, for example, rhenium, iridium, tin or germanium, so as to increase the octane rating of the gasolines but also to produce hydrogen. The catalytic reforming processes make it possible to produce hydrogen with yields typically encompassed between 2 and 4% by weight of hydrogen relative to the feedstock of the reforming unit.

In the case of this invention, the hydrogenation of the naphtha fraction that was carried out above in zone 400 before its introduction into catalytic reforming zone 500 advantageously ultimately makes possible an increased production of hydrogen.

The following examples illustrate the invention and its advantages without limiting its scope.

EXAMPLE 1

Preparation of a Dry Gas

A standard catalytic cracking unit whose capacity is equal to 35,000 barrels/day is used. The amount of dry gas that is produced is 8.1 tons/hour (t/h). Table 2 below provides the composition of dry gas after separation and washing according to the techniques and processes that are described above:

TABLE 2

| Component | Mol % | Molecular Weight (g/mol) |
|---|---|---|
| Methane | 22.67 | 16 |
| Ethane | 11.12 | 30 |
| Ethylene | 10.91 | 28 |
| Propane | 0.84 | 44 |
| Propylene | 2.83 | 42 |
| Isobutane | 0.52 | 58 |
| Isobutene | 0.1 | 56 |
| n-Butene | 0.1 | 56 |
| n-Butane | 0.1 | 58 |
| CO | 0.94 | 28 |
| CO2 | 3.46 | 44 |
| H2 | 35.29 | 2 |
| N2 | 11.12 | 28 |

EXAMPLE 2

For Comparison

A catalytic reforming unit whose capacity is 22,500 barrels/day and in which is injected a flow of 111.8 t/h of naphtha is also used.

This unit treats a naphtha whose PNA (proportions by mass of paraffins/naphthenes/aromatic compound) is equal to 42/44/14 (% by weight) and whose density is equal to 0.75, in a low-pressure regenerative reforming unit (0.45 MPa) and that produces a reformate with a research octane number RON=100.

The yield of C5+gasoline of this reforming unit is equal to 91% by weight. The benzene yield is equal to 5.2% by weight.

This reforming unit therefore produces 101.74 t/h of reformate and 3.58 t/h of hydrogen. The amount of benzene in the reformate is equal to 5.8 t/h.

At the outlet of the reforming unit, a distillation is initiated so as to recover, at the top of the column, a fraction whose distillation interval is encompassed between 32 and 92° C. and that contains all of the benzene that is produced. This fraction is called a light reformate; it represents 20% of the total reformate and contains 28.5% of benzene (by weight).

EXAMPLE 3

According to the Invention

In the presence of a catalyst for alkylation of benzene, the light reformate that is described in Example 2 is brought into contact, in a first zone, with all of the dry gas that is produced by the catalytic cracking unit of Example 1 (or 8.1 t/h of dry gas and 20.4 t/h of light reformate).

The molar flow rates at the inlet of the alkylation zone are as follows:

Dry hydrogen gas: 162 kmol/h
Ethylene: 50 kmol/h
Propylene: 12.9 kmol/h
Benzene: 74.5 kmol/h The alkylation process is carried out in a reactor that contains a catalyst that contains 80% by weight of Y zeolite and 20% by weight of alumina, and whose Si/Al (silica/alumina) molar ratio is equal to 20, at a temperature of 270° C. and under a pressure of 0.5 MPa, whereby the PPH (expressed in terms of gram of benzene/gram of catalyst/hour) is 0.4 $h^{-1}$.

Under these conditions, the conversion of the ethylene and the propylene is close to 100%. At the outlet of the alkylation zone, the following molar flow rates are finally obtained:

Ethylene: 0
Propylene: 0
Benzene: 19.5 kmol/h or 1.52 t/h
Alkylated aromatic compounds (ethylbenzene, diethylbenzene, cumene, diisopropylbenzene): 55 kmol/h or 6.23 t/h.

The flow rate of reformate at the outlet of the alkylation zone, comprising the alkylated aromatic compounds and benzene that has not reacted, is equal to 22.34 t/h.

In contrast, a flow rate of 6.158 t/h of dry gas that contains hydrogen (324 kg/h of H2) and from which olefins are largely removed, is recovered. This dry gas is used according to this example to carry out a partial hydrogenation of the aromatic compounds that are contained in the naphtha fraction that is described in Example 2. In other words, in a second zone, the hydrogenation of a portion of the aromatic compounds of said naphtha is carried out by the hydrogen that is contained in the dry gas that is recovered at the outlet of the alkylation zone.

The hydrogenation is carried out in the presence of a catalyst for hydrogenation of aromatic compounds with an Ni base that rests on an alumina with a specific surface area of 130 $m^2/g$ and a pore volume that is equal to 1.04 cc/g (cubic centimeter per gram). The nickel content is 20% by weight expressed in Ni oxide (NiO), whereby the metal is deposited by an impregnation stage of a mineral precursor (nickel nitrate). The catalyst is then dried and calcined at high temperature so as to transform the metallic precursors into oxide particles that are finally reduced under a hydrogen flow at 350° C. for 2 hours. The hydrogenation reaction is carried out at a temperature of 130° C. and a pressure of 0.6 MPa, whereby the hourly volumetric flow rate is 8 $h^{-1}$ relative to the liquid feedstock.

The flow rates by mass of the reagents at the inlet of the hydrogenation zone are:

Naphtha: 111.8 t/h (including 15.65 t/h of aromatic compounds)
Dry gas flow rate: 6.158 t/h (containing 324 kg/h of hydrogen)

Under the conditions that are described above, the conversion of the hydrogen is essentially equal to 99%.

At the outlet of the hydrogenation zone, a gas fraction that contains the lightest elements, i.e., primarily hydrogen that has not reacted (1.6 kmol/h) and the hydrocarbons that contain 1 to 4 carbon atoms and other compounds with a flow rate of 5.83 t/h, a liquid fraction that consists of hydrogenated naphtha with a flow rate of 112.12 t/h including 94.13 kmol/h of aromatic compounds and 53.47 kmol/h of naphthenes are obtained.

In the reforming unit of Example 2, a reforming of the naphtha that has been hydrogenated is initiated. The hydrogen that is initially present in the FCC dry gas is then finally "restored" during the reforming operation.

The total flow rate of the hydrogen that is produced by the process according to this invention is 3.904 t/h or an increase of 9% of the amount of hydrogen relative to the amount of hydrogen that is produced from the same naphtha but not hydrogenated.

In addition, after the reformate is fractionated according to the same distillation principle as that of Example 2, an amount of 20.4 t/h of light reformate that is rich in benzene and that is recycled in the alkylation zone described above, and 81.6 t/h of heavy reformate are obtained.

The amount of gasoline that is finally obtained, constituted by the sum of the heavy reformation that is obtained from the reforming unit and the reformate at the outlet of the alkylation zone increases from 2.2 t/h relative to the gasoline flow rate that is obtained in Example 2. In addition, this gasoline is low in benzene since the percentage by weight of benzene in the reformate is 1.46%, whereas it was 5.7% in Example 2.

The process according to this invention therefore makes it possible to recover the hydrogen that is contained in, for example, a dry gas that is obtained from an FCC process, to lower in a sensible way the benzene content of the reformate, and to considerably increase the volume of gasoline that was finally produced.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever. Also, any preceding examples can be repeated with similar success by substituting the generically or specifically described reactants and/or operating conditions of this invention for those used in such examples.

Throughout the specification and claims, all temperatures are set forth uncorrected in degrees Celsius, and all parts and percentages are by weight, unless otherwise indicated.

The entire disclosures of all applications, patents and publications, cited herein and of corresponding French Application No. 02,12452, filed on Oct. 8, 2002, are incorporated by reference herein.

From the foregoing description, one skilled in the art can easily ascertain the essential characteristics of this invention and, without departing from the sprit and scope thereof, can make various changes and modifications of the invention to adapt it to various usages and conditions.

The invention claimed is:

1. A process for recovery of hydrogen from an effluent rich in hydrocarbons and that also contains hydrogen and a light olefin fraction, said process comprising:

in a stage a), contacting said effluent rich in hydrocarbons with at least one reagent, that can react with said olefins to form a complex or a molecule, to form a substantially olefin-free effluent;

a stage c), contacting at least a part of the substantially olefin-free effluent with a composition comprising at least one unsaturated compound in the presence of a catalyst under hydrogenation conditions se-as to hydrogenate at least a portion of said unsaturated compound by at least a portion of the hydrogen present in said substantially olefin-free effluent thereby forming a hydrogen-depleted effluent containing hydrogenated hydrocarbons; and in a stage d), dehydrogenating hydrogenated hydrocarbons present in said hydrogen-depleted effluent from stage c) to recover a stream containing hydrogen.

2. A process according to claim 1, further comprising, in a stage b), separating said complexes or said molecules from said substantially olefin-free effluent obtained from stage a) before introducing at least part of said substantially olefin-free effluent into stage c).

3. A process according to claim 1, wherein said composition comprising at least one unsaturated compound used in stage c) is a naphtha fraction.

4. A process according to claim 1, wherein the catalyst used in stage c) comprises nickel deposited on a mineral substrate selected from silica and alumina.

5. A process according to claim 1, wherein at least one alkylation reaction is performed in stage a) and said reagent used in stage a) comprises at least one aromatic compound having 6 to 12 carbon atoms per molecule.

6. A process according to claim 5, wherein said at least one alkylation reaction is carried out in the presence of a catalyst.

7. A process according to claim 6, wherein the dehydrogenation reaction performed in stage d) is a catalytic reforming reaction.

8. A process according to claim 7, wherein the catalyst of said catalytic reforming reaction comprises a chlorinated alumina substrate on which is deposited at least one metal selected platinum, rhenium, iridium, tin and germanium.

9. A process according to claim 7, wherein the composition used in stage c) comprises at least a portion of the products obtained from said catalytic reforming reaction.

10. A process according to claim 1, wherein said effluent is a dry gas fraction obtained from a fluidized-bed catalytic cracking stage.

11. A process according to claim 1, wherein said effluent rich in hydrocarbons is a dry gas fraction obtained from a steam reforming process, a catalytic reforming process, a gasification process, a partial oxidation process, an autothermal process that combines reforming and partial oxidation a coking process, or a visbreaking process.

12. A process according to claim 3, wherein said naphtha fraction is obtained by atmospheric distillation of a crude petroleum.

13. A process according to claim 12, wherein the starting and end points of distillation for said naphtha fraction are encompassed between 80 and 180° C.

14. A process according to claim 6, wherein said at least one alkylation reaction is a vapor-phase process.

15. A process according to claim 6, wherein said at least one alkylation reaction is a liquid-phase process.

16. A process according to claim 6, wherein said at least one alkylation reaction is a mixed gaseous/liquid phase process.

17. A process according to claim 1, wherein the dehydrogenation reaction performed in stage d) is a catalytic reforming reaction.

18. A process according to claim 8, wherein the composition used in stage c) comprises at least a portion of the products obtained from said catalytic reforming reaction.

19. A process according to claim 1, wherein said effluent rich in hydrocarbons is a dry gas fraction obtained from a catalytic reforming process.

20. A process according to claim 1, wherein the composition used in stage c) comprises products obtained from a catalytic reforming reaction.

21. A process according to claim 2, wherein said effluent rich in hydrocarbons is a dry gas fraction obtained from a fluidized-bed catalytic cracking process.

22. A process according to claim 1, wherein said effluent rich in hydrocarbons contains 5–50 mol % of hydrogen.

23. A process according to claim 2, wherein said composition comprising at least one unsaturated compound used in stage c) is a naphtha fraction.

24. A process according to claim 2, wherein the catalyst used in stage c) comprises nickel deposited on a mineral substrate selected from silica and alumina.

25. A process according to claim 1, wherein at least one alkylation reaction is performed in stage a) and said reagent used in stage a) comprises at least one aromatic compound having 6 to 12 carbon atoms per molecule.

26. A process according to claim 25, wherein said at least one alkylation reaction is carried out in the presence of a catalyst.

27. A process according to claim 26, wherein the dehydrogenation reaction performed in stage d) is a catalytic reforming reaction.

28. A process according to claim 27, wherein the catalyst of said catalytic reforming reaction comprises a chlorinated alumina substrate on which is deposited at least one metal selected from platinum, rhenium, iridium, tin and germanium.

29. A process according to claim 7, wherein the composition used in stage c) comprises at least a portion of the products obtained from said catalytic reforming reaction.

30. A process according to claim 1, wherein said effluent rich in hydrocarbons is a dry gas fraction obtained from a fluidized-bed catalytic cracking stage.

31. A process according to claim 2, wherein said effluent rich in hydrocarbons is a dry gas fraction obtained from a steam reforming process, a catalytic reforming process, a gasification process, a partial oxidation process, an autothermal process that combines reforming and partial oxidation, a coking process, or a visbreaking process.

* * * * *

UNITED STATES PATENT AND TRADEMARK OFFICE
CERTIFICATE OF CORRECTION

PATENT NO. : 7,081,558 B2 Page 1 of 1
APPLICATION NO. : 10/680417
DATED : July 25, 2006
INVENTOR(S) : Gauthier et al.

It is certified that error appears in the above-identified patent and that said Letters Patent is hereby corrected as shown below:

Column 11, line 5 reads "a stage c)" should read -- in a stage c) --
Column 11, line 8 reads "conditions se-as to" should read -- conditions to --
Column 11, line 41 reads "selected platinum" should read -- selected from platinum --
Column 11, line 46 reads "is a dry gas" should read -- rich in hydrocarbons is a dry gas --
Column 12, line 49 reads "claim 1" should read -- claim 7 --

Signed and Sealed this

Twenty-third Day of January, 2007

JON W. DUDAS
*Director of the United States Patent and Trademark Office*